(12) United States Patent
Aoki

(10) Patent No.: US 10,878,843 B2
(45) Date of Patent: Dec. 29, 2020

(54) HEAD SUSPENSION ASSEMBLY FOR DISK DEVICE AND INCLUDING DAMPER

(71) Applicants: Kabushiki Kaisha Toshiba, Tokyo (JP); Toshiba Electronic Devices & Storage Corporation, Tokyo (JP)

(72) Inventor: Kenichiro Aoki, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/563,060

(22) Filed: Sep. 6, 2019

(65) Prior Publication Data

US 2020/0294539 A1 Sep. 17, 2020

(30) Foreign Application Priority Data

Mar. 15, 2019 (JP) .................................. 2019-048937

(51) Int. Cl.
*G11B 5/48* (2006.01)
*G11B 5/55* (2006.01)

(52) U.S. Cl.
CPC ............ *G11B 5/4833* (2013.01); *G11B 5/483* (2015.09); *G11B 5/486* (2013.01); *G11B 5/4853* (2013.01); *G11B 5/4886* (2013.01); *G11B 5/5565* (2013.01)

(58) Field of Classification Search
CPC ..... G11B 5/4833; G11B 5/4853; G11B 5/486; G11B 5/4873
USPC .......... 360/294.4, 244.2, 245.4, 245.8, 245.9
See application file for complete search history.

(56) References Cited

U.S. PATENT DOCUMENTS

| 8,988,831 B1* | 3/2015 | Kido .................... G11B 5/4853 360/245.9 |
| 9,330,697 B2 | 5/2016 | Miller et al. |
| 9,368,129 B1 | 6/2016 | Hahn et al. |
| 2005/0135013 A1* | 6/2005 | Sassine ................ G11B 5/4833 360/244.9 |
| 2008/0062571 A1* | 3/2008 | Toukairin ............. G11B 5/4833 360/245.9 |

(Continued)

FOREIGN PATENT DOCUMENTS

| JP | 4056296 B2 | 3/2008 |
| JP | 2011-138596 A | 7/2011 |
| WO | 03-100289 A1 | 12/2003 |

OTHER PUBLICATIONS

JDC, JDC Disk Drive Solutions, Registered ISO 9001:2008, "Preliminary Technical Data, MD90—Ultra High Purity Damping Polymer," Feb. 29, 2012, 2 pages.

*Primary Examiner* — Jefferson A Evans
(74) *Attorney, Agent, or Firm* — White & Case LLP

(57) ABSTRACT

According to one embodiment, a head suspension assembly includes a support plate having a proximal end and a distal end, a wiring member on the support plate and including a metal plate and a wiring board laid on the metal plate, the metal plate including a first joined portion joined to the support plate close to the distal end and a second joined portion joined to the support plate and located on a proximal end side of the support plate, a head mounted on the wiring member, an extendable piezoelectric element mounted on the wiring member, and a damper including a viscoelastic layer and a constraint layer stacked on the viscoelastic layer and attached to the support plate to cover the first joined portion and the second joined portion.

16 Claims, 11 Drawing Sheets

(56) References Cited

U.S. PATENT DOCUMENTS

| | | |
|---|---|---|
| 2011/0211274 A1 | 9/2011 | Kuwajima |
| 2011/0211280 A1 | 9/2011 | Chen et al. |
| 2012/0229934 A1* | 9/2012 | McCaslin ............ G11B 5/4826 360/245.8 |
| 2013/0242434 A1* | 9/2013 | Bjorstrom ............ G11B 5/4873 360/234.4 |
| 2013/0321958 A1* | 12/2013 | Ikeji ....................... G11B 5/486 360/245.8 |
| 2014/0139953 A1* | 5/2014 | Hatch .................... G11B 5/483 360/234.5 |
| 2018/0182418 A1* | 6/2018 | Ee ........................ G11B 5/4833 |

* cited by examiner

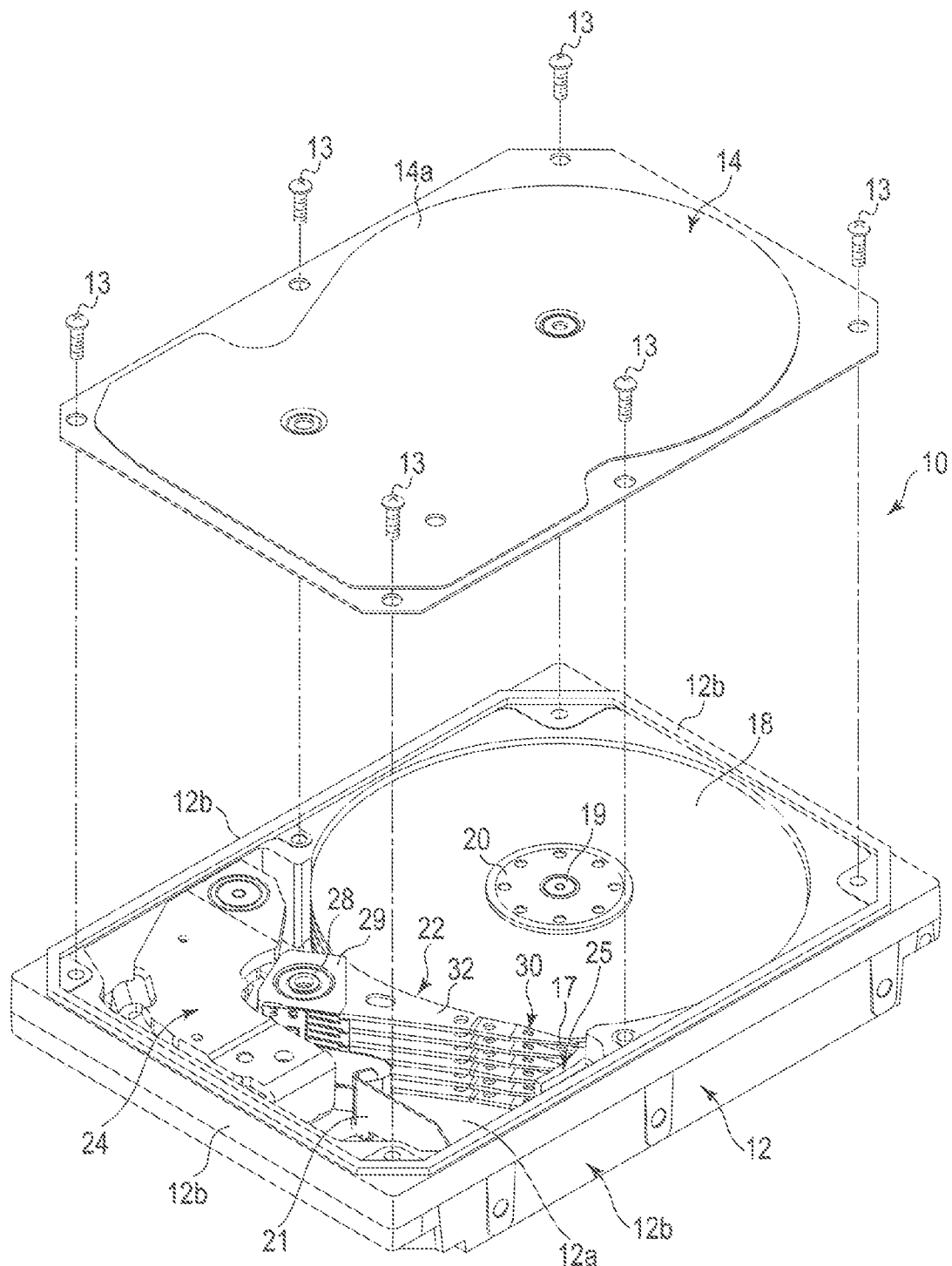
F I G. 1

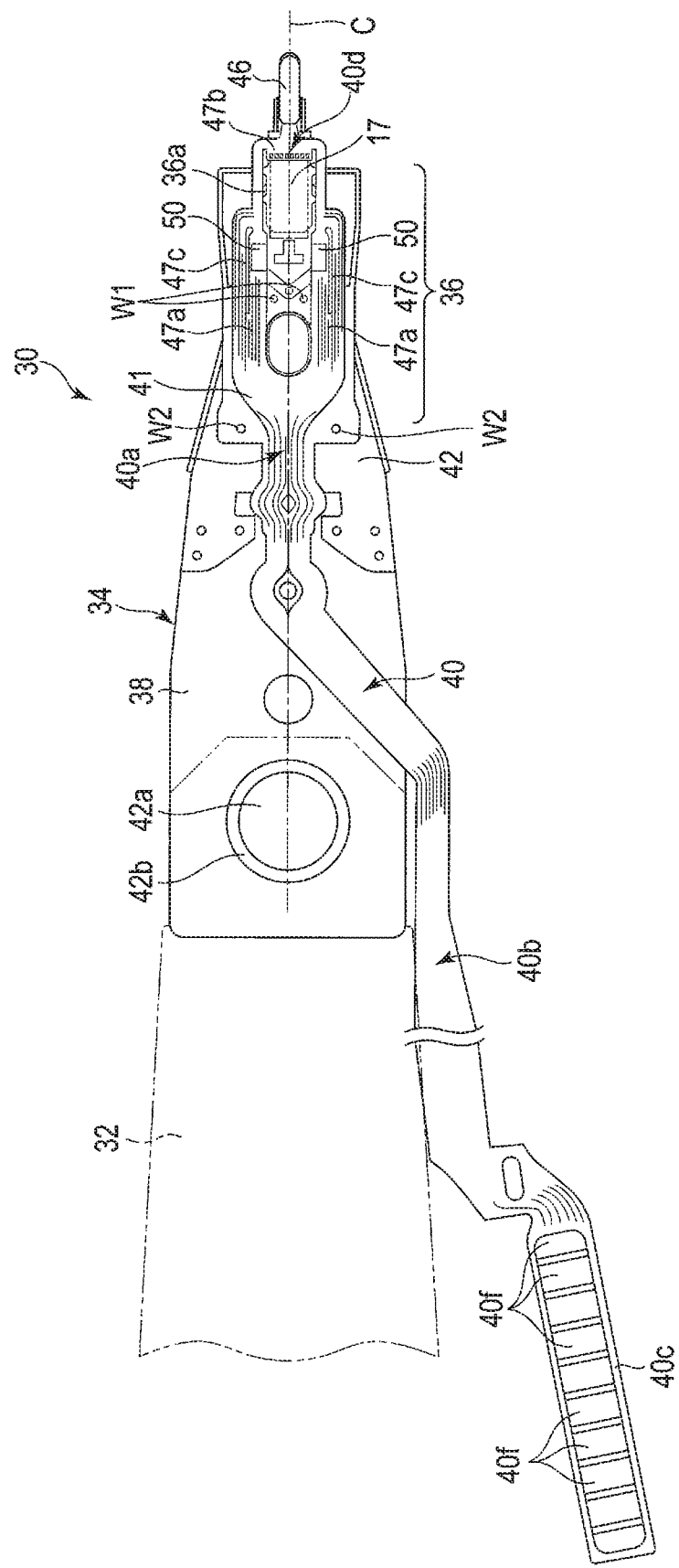
F I G. 2

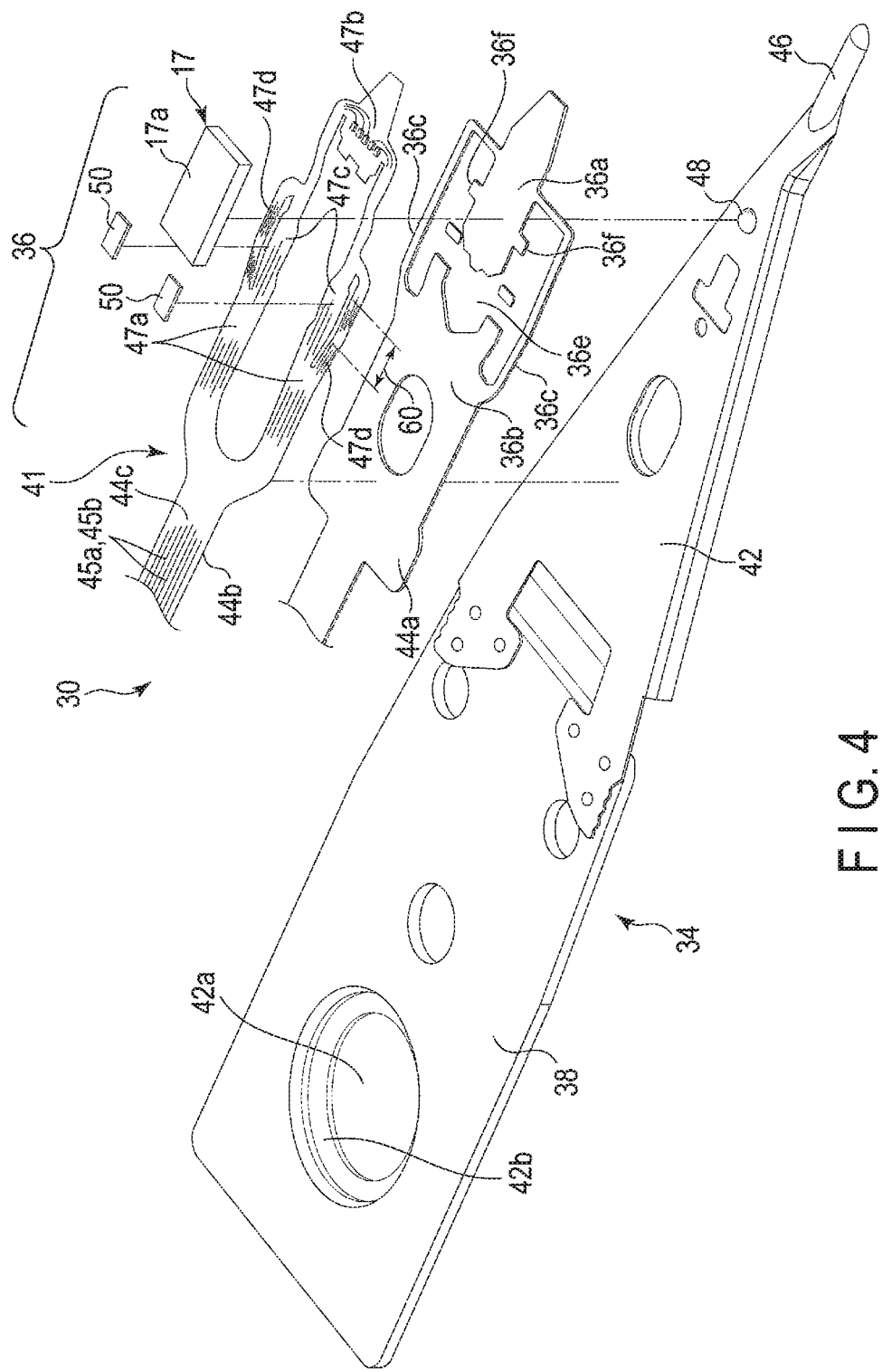
F I G. 4

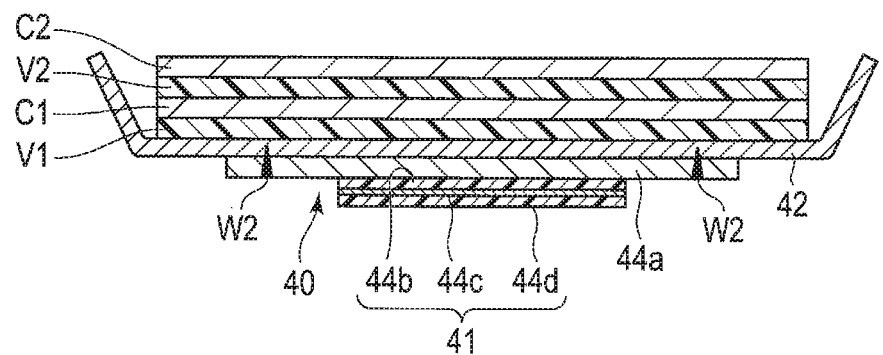
F I G. 7
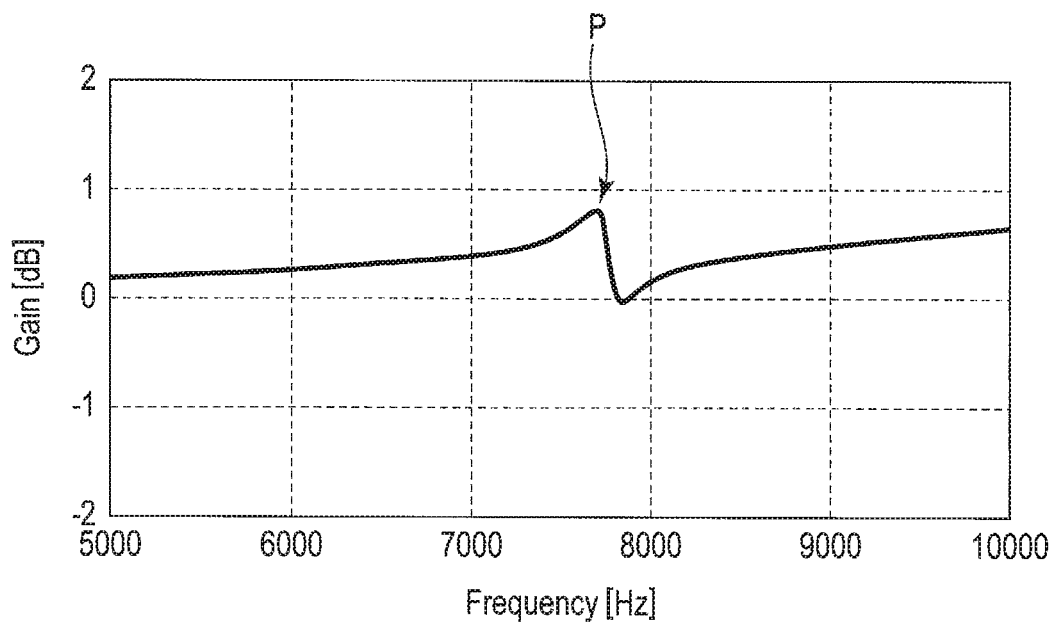
F I G. 8

HEAD SUSPENSION ASSEMBLY FOR DISK DEVICE AND INCLUDING DAMPER

CROSS-REFERENCE TO RELATED APPLICATIONS

This application is based upon and claims the benefit of priority from Japanese Patent Application No. 2019-048937, filed Mar. 15, 2019, the entire contents of which are incorporated herein by reference.

FIELD

Embodiments described herein relate generally to a head suspension assembly and a disk device including the assembly.

BACKGROUND

As a disk device, for example, a hard disk drive (HDD) comprises a plurality of magnetic disks provided rotatably in a housing, a plurality of magnetic heads that read and write data from and to the magnetic disks, and a head actuator that supports the magnetic heads to be movable with respect to the magnetic disks.

The head actuator includes a plurality of head suspension assemblies each supporting the magnetic head at a distal end. Each of the head suspension assemblies includes a base plate one end of which is fixed to an arm, a load beam extending from the base plate, and a flexure (wiring member) provided on the load beam and the base plate. The flexure includes a displaceable gimbal portion, and a magnetic head is supported on the gimbal portion. A damper is provided on the load beam to attenuate vibration.

A head suspension assembly including piezoelectric elements that constitute a microactuator has recently been proposed. The piezoelectric elements are mounted on the flexure. In the head suspension assembly, the piezoelectric elements move up and down in the thickness direction of the flexure when they expands and contracts. This movement generates torsional vibration from the load beam. The torsional vibration may cause resonance on the load beam because the resonance frequency of the load beam is relatively low. As a result, the magnet heads are vibrated to decrease the accuracy of positioning. Since the attenuation characteristic of the damper varies with temperature, the torsional vibration of the load beam is difficult to suppress in a wide temperature range.

BRIEF DESCRIPTION OF THE DRAWINGS

FIG. 1 is an exploded perspective view of a hard disk drive (HDD) according to a first embodiment.

FIG. 2 is a plan view of a head suspension assembly of the HDD.

FIG. 4 is an exploded perspective view of the head suspension assembly.

FIG. 7 is a sectional view of the head suspension assembly, taken along line A-A of FIG. 6.

FIG. 8 is a graph of the relationship between a torsional vibration frequency and a gain when piezoelectric elements of the head suspension assembly are vibrated.

DETAILED DESCRIPTION

Figure 3:
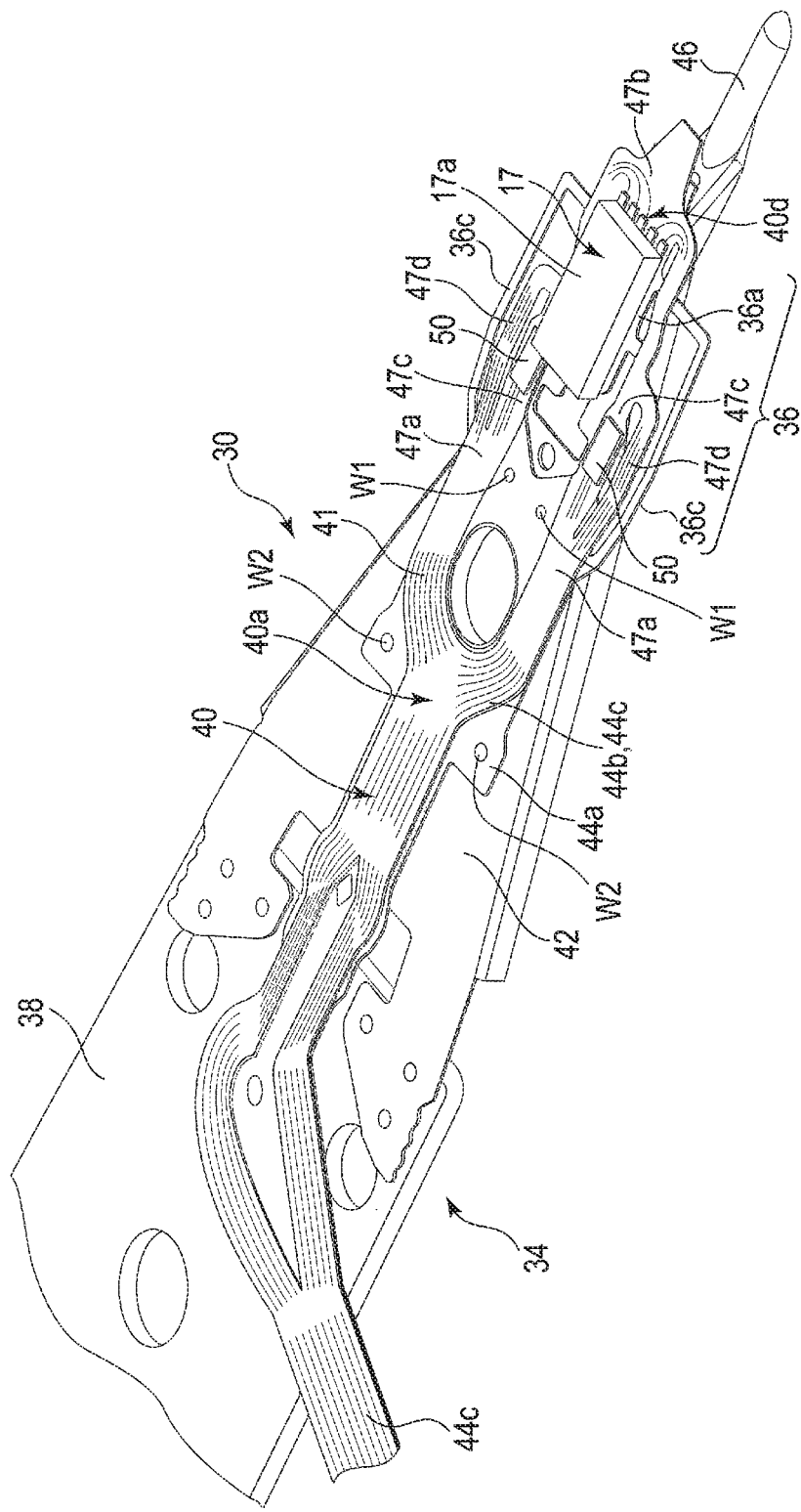
FIG. 3 is a perspective view of the head suspension assembly.

Various embodiments will be described hereinafter with reference to the accompanying drawings. In general, according to one embodiment, a head suspension assembly comprises a support plate having a proximal end and a distal end; a wiring member placed on the support plate and including a metal plate and a wiring board laid on the metal plate, the metal plate including a first joined portion joined to the support plate close to the distal end and a second joined portion joined to the support plate and located on a proximal end side of the support plate with respect to the first joined portion; a head mounted on the wiring member; an extendable piezoelectric element mounted on the wiring member; and a damper including a viscoelastic layer and a constraint layer stacked on the viscoelastic layer and attached to the support plate to cover the first joined portion and the second joined portion.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

As a disk device, a hard disk drive (HDD) according to a first embodiment will be described in detail.

FIG. 1 is an exploded perspective view of the HDD according to the first embodiment, which is uncovered. As illustrated in FIG. 1, the HDD includes a rectangle housing 10. The housing 10 includes a rectangle, box-shaped base 12 whose top is opened and a cover (top cover) 14. The base 12 has a rectangle bottom wall 12a and side walls 12b standing along the peripheral edge of the bottom wall 12a, and is formed integrally with, e.g., aluminum as one component. The cover 14 is formed like a rectangle plate by, e.g., stainless steel. The cover 14 is fixed on the side wall 12b of the base 12 with a plurality of screws 13 to block the top opening of the base 12 hermetically.

In the housing 10 are provided a plurality of e.g., five) magnetic disks 18 as a disk-shaped recording medium and a spindle motor 19 that supports and rotates the magnetic disks 18. The spindle motor 19 is provided on the bottom wall 12a. Each of the magnetic disks 18 is formed like a circular plate whose diameter is, for example, 95 mm (3.5 inches), and has a magnetic recording layer on its upper surface and/or lower surface. The magnetic disks 18 are coaxially fitted to a hub (not shown) of the spindle motor 19 and clamped by a clamp spring 20, and thus fixed to the hub. The magnetic disks 18 are supported in parallel with the bottom wall 12a of the base 12. The magnetic disks 18 are rotated at a predetermined rotational speed by the spindle motor 19.

In the first embodiment, five magnetic disks 18 are housed in the housing 10; however, the number of magnetic disks 18 is not limited to five but may increase or decrease. Also, a single magnetic disk 18 may be housed in the housing 10.

In the housing 10 are provided a plurality of magnetic heads 17 (see FIG. 2) which record and reproduce information on and from the magnetic disks 18 and a head actuator 22 which supports the magnetic heads 17 to be movable with respect to the magnetic disks 18. HDD comprises a voice coil motor (VCM) 24 that rotates and positions the head actuator 22, a ramp load mechanism 25 that holds the magnetic heads 17 in unloading positions spaced away from the magnetic disks 18 when the magnetic heads 17 move to the outermost peripheries of the magnetic disks 18, and a substrate unit (FPC unit) 21 mounted with electronic components such as a conversion connector, which are accommodated in the housing 10.

The head actuator 22 comprises an actuator block 29 incorporating a bearing unit 28, a plurality of arms 32 extending from the actuator block 29, and suspension assemblies 30 (also referred to as a head gimbal assemblies (HGA)) extending from their respective arms 32. The magnetic head 17 is supported on the distal end portion of each of the suspension assemblies 30. The head actuator 22 is rotatably supported on an axis standing on the bottom wall 12a through the bearing unit 28.

A printed circuit board (not shown) is screwed on the outer surface of the bottom wall 12a. The printed circuit board is provided with a control unit that controls the operation of the spindle motor 19 and also controls the operations of the VCM 24 and the magnetic heads 17 through the substrate unit 21.

Next is a detailed description of the configuration of the suspension assemblies 30.

FIG. 2 is a plan view of a suspension assembly and FIG. 3 is a perspective view of the suspension assembly.

As illustrated in FIGS. 2 and 3, the suspension assembly 30 includes a suspension 34 extending from the arm 32, and the magnetic head 17 is attached to the distal end of the suspension 34. Note that the combination of the magnetic head 17 and the suspension assembly 30 that supports the magnetic head 17 is referred to as a head suspension assembly.

The suspension 34, which functions as a support plate, includes a rectangular base plate 38 made of a metal plate whose thickness is several hundred micrometers and an elongated, plate spring-shaped load beam 42 made of a metal plate of several tens of micrometers thick. The load beam 42 is placed such that its proximal end portion is put on the distal end portion of the base plate 38 and is fixed to the base plate 38 by welding a plurality of portions. The width of the proximal end portion of the load beam 42 is substantially equal to that of the base plate 38. A rod-shaped tab 46 projects from the distal end of the load beam 42.

The base plate 38 includes a circular opening 42a at its proximal end portion and an annular protrusion 42b around the opening 42a. The base plate 38 is fastened to the distal end portion of the arm 32 by fitting the protrusion 42b into a circular caulking hole (not shown) formed on the caulking seat surface of the arm 32 and thus caulking the protrusion 42b. The proximal end of the base plate 33 may be fixed to the distal end of the arm 32 by laser welding, spot welding or adhesion.

The suspension assembly 30 comprises an elongated, belt-shaped flexure (wiring member) 40 for transmitting recording and reproduction signals and drive signals of piezoelectric elements 50, and a pair of piezoelectric elements (e.g., PZT elements) 50 mounted on the flexure 40. As shown in FIG. 2, the flexure 40 includes a distal end portion 40a placed on the load beam 35 and base plate 38 and a rear half portion (extending portion) 40b extending outward from the side edge of the base plate 38 and also extending along the side edge of the arm 32. A connection end portion 40c is located at the proximal end of the extending portion 40b and includes a plurality of connection pads 40f. These connection pads 40f are connected to the main FPC of the substrate unit 21 described above.

The distal end portion of the flexure 40 is located on the distal end portion of the load beam 35 to constitute a gimbal portion 36 that functions as an elastic support portion. The magnetic head 17 is placed and fixed on the gimbal portion 36 and supported by the load beam 35 through the gimbal portion 36. The pair of piezoelectric elements 50 composing a microactuator is mounted on the gimbal portion 36 and located close to the magnetic head 17. In the first embodiment, the piezoelectric elements 50 are disposed on the proximal end side of the load beam 35 with respect to the magnetic head 17.

FIG. 4 is an enlarged plan view of the distal end portion of the suspension assembly 30.

As illustrated in FIGS. 3 and 4, the flexure 40 includes a metal sneer (metal plate) 44a such as stainless steel, which serves as a base, and a belt-shaped laminate member (wiring board) 41 stuck or fixed on the metal sheet 44a to form an elongated laminate plate. The laminate member 41 includes a base insulation layer (first insulation layer) 44b which is largely fixed to the metal sheet 44a, a conductive layer (wiring pattern) 44c which is formed on the base insulation layer 44b to constitute a plurality of signal lines 45a, drive lines 45b and a plurality of connection pads, and a cover insulation layer (second insulation layer) 44d stacked on the base insulation layer 44b to cover the conductive layer 44c (see FIG. 7). As the conductive layer 44c, for example, copper foil can be used. In the distal end portion 40a of the flexure 40, the metal sheet 44a is stuck on the surface of the load beam 35 and that of the base plate 38 and a plurality of portions are welded by spot welding to form a junction (joined portion).

In the gimbal portion 36 of the flexure 40, the metal sheet 44a includes a rectangular tongue portion (support portion) 36a located on the distal end side, an almost rectangular proximal end portion (proximal end plate portion) 36b located on the proximal end side with space between the tongue portion 36 and the proximal end portion 36b, a pair of elongated outriggers (link portions) 36c extending to the proximal end portion 36b from the tongue portion 36a, and a pair of handles (support protrusions) 36f protruding from both side edges of the tongue portion 36a.

The proximal end portion 36b is stuck on the surface of the load beam 35 or fixed on the surface of the load beam 35 by spot welding. As shown in FIG. 3, in the first embodiment, the proximal end portion 36b of the metal sheet 44a is welded to the load beam 42 by spot welding at four points including two first welding portions W1 close to the head 17 and two second welding portions W2 on the proximal end side of the load beam 42. The number of welding portions (welding points) is not limited to four as described above but may increase or decrease if necessary.

The tongue portion 36a is sized and shaped to place the magnetic head 17 and is, for example, almost rectangular. The tongue portion 36a is placed such that its width-direction central axis coincides with the central axis C of the suspension 34 (see FIG. 2). In addition, substantially the central part of the tongue portion 36a abuts on a dimple (convex portion) 48 which protrudes from the distal end portion of the load beam 35. The tongue portion 36a can be displaced in various directions by elastically deforming the pair of outriggers 36c. Accordingly, the tongue portion 36a and the magnetic head 17 can flexibly follow the surface variation of a magnetic disk 18 in the roll and pitch directions to maintain a very small gap between the surface of the magnetic disk 18 and the magnetic head 17.

In the gimbal portion 36, part of the laminate member 41 is bifurcated and located on both sides of the central axis C of the suspension 34. The laminate member 41 includes a proximal end portion 47a that is fixed to the proximal end portion 36b of the metal sheet 44a, a distal end portion 47b stuck to the tongue portion 36a, a pair of belt-shaped first bridge portions 47c extending from the proximal end portion 47a to the distal end portion 47b, and a pair of belt-shaped first bridge portions 47d extending from the proximal end portion 47a to the halfway points of the first bridge portions 47c along the first bridge portions 47c and merging with the first bridge portions 47c. The first bridge portions 47c are arranged alongside the outriggers 36c on both sides of the tongue portion 36a and extend in the longitudinal direction of the load beam 35. The first bridge portions 47c also extend on the handles 36f and the crossbar of the outriggers 36c and are partly fixed thereto. Part of each of the first bridge portions 47c constitutes a mounting portion 60 mounted with the piezoelectric elements 50.

The magnetic head 17 is fixed to the tongue portion 36a by an adhesive. The magnetic head 17 is placed such that its longitudinal-direction central axis coincides with the central axis of the suspension 34 and its substantially central part is located on the dimple 48. The recording and reproduction elements of the magnetic head 17 are electrically bonded to a plurality of electrode pads 40d of the distal end portion 47b by a conductive adhesive such as solder and silver paste. Thus, the magnetic head 17 is connected to the signal lines 45a via the electrode pads 40d.

As one example, each of the piezoelectric elements 50 serving as drive elements is shaped in a flat rectangular parallelepiped by piezoelectric materials and has a pair of electrodes (not shown) on its one surface. The piezoelectric elements 50 are mounted on the mounting portion 60 of the flexure 40, and the electrodes are electrically and mechanically bonded to the connection pads (not shown) of the flexure 40. In the first embodiment, the piezoelectric elements 50 are arranged such that their longitudinal directions are substantially parallel to the central axis C of the suspension 34; however, the direction in which the piezoelectric elements 50 are arranged is not limited thereto, but they may be arranged such that their longitudinal directions cross the central axis C. Furthermore, the mounting portion 60 of the flexure 40 can be divided under the piezoelectric elements 50 and bonded to the piezoelectric elements 50 through the connection pads so as to be connected via the piezoelectric elements 50.

When a voltage (drive signal) is applied to the piezoelectric elements 50 through the drive lines 45b, the piezoelectric elements 50 expand and contract in their longitudinal directions. When the piezoelectric elements 50 are driven to expand and contract in opposite directions, the pair of first bridge portions 47c stroke in opposite directions. The first bridge portions 47c swing the tongue portion 36a of the gimbal portion 36 and the magnetic head 17 around the dimple 48 through the handles 36f. The expand and contract operation of the piezoelectric elements 50 makes it possible to displace the magnetic head 17 slightly.

Figure 5:
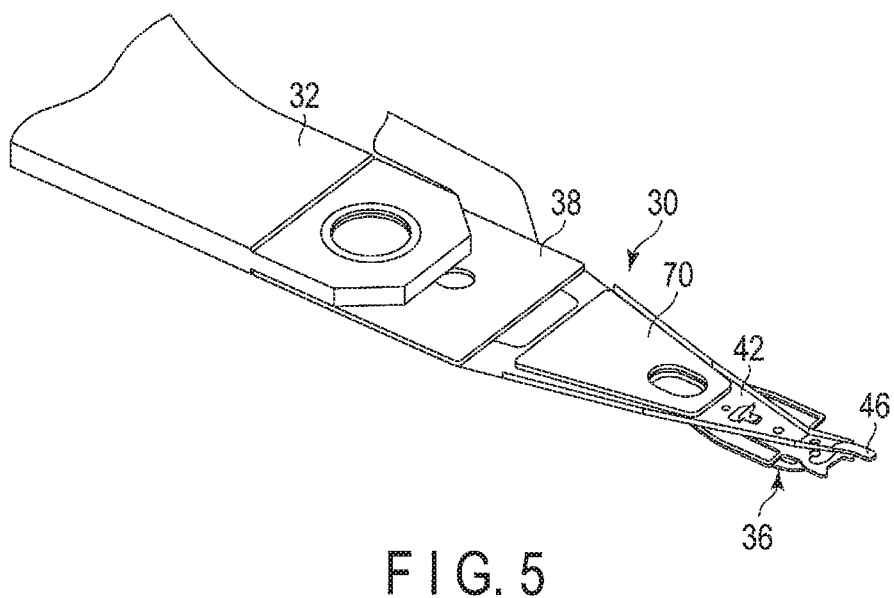
FIG. 5 is a perspective view of the top surface side of the head suspension assembly.
Figure 6:
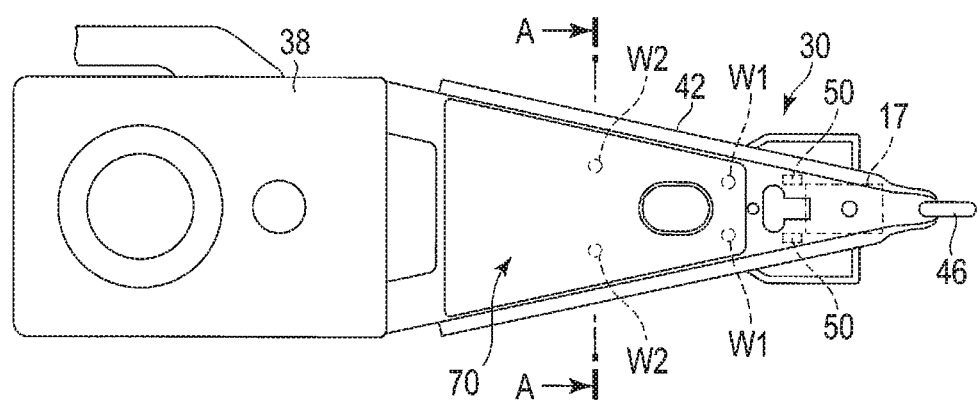
FIG. 6 is a plan view of the head suspension assembly.

FIG. 5 is a perspective view showing the top side of the head suspension assembly (the surface opposite to the magnetic head), FIG. 6 is a plan view of the head suspension assembly and FIG. 7 is a sectional view showing the head suspension assembly along line A-A of FIG. 6.

As shown in FIGS. 5 and 6, the head suspension assembly 30 includes a damper 70 stuck to the load beam 42. In the first embodiment, the damper 70 is provided on the upper surface of the load beam 42, that is, the surface opposite to the surface on which the magnetic head 17 is mounted. The damper 70 is shaped like a trapezoid on the plan view, and its width is approximately equal to the width of the load beam 42 and its length (height) is equal to 50% or more of the axial-direction length of the load beam 42, such as about 70%. The damper 70 is laid over from the proximal end portion of the load beam 42 to the vicinity of the distal end portion thereof to cover approximately 70% of the area of the load beam 42. The damper 70 is also put on the first welding portions W1 on the distal end side of the load beam 42 and the second welding portions W2 on the proximal end side of the load beam 42 to cover these first and second welding portions W1 and W2.

The damper 70 includes a first viscoelastic layer, a second viscoelastic layer whose temperature characteristics, i.e., viscoelastic materials are different from those of the first viscoelastic layer or whose materials are the same as those of the first viscoelastic layer and whose characteristics are different from those of the first viscoelastic layer, and at least one constraint layer. As illustrated in FIG. 7, in the first embodiment, the damper 70 includes a first viscoelastic layer V1, a first constraint layer C1, a second viscoelastic layer V2 and a second constraint layer C2, and these layers are stacked in the above-described order in a direction perpendicular to the surface to constitute a laminate (damper). The first viscoelastic layer V1, first constraint layer C1, second viscoelastic layer V2 and second constraint layer C2 have substantially the same planar shape. The first viscoelastic layer V1 has good damping characteristics at high temperature and is stuck on the surface of the load beam 42. The first constraint layer C1 is stacked on the first viscoelastic layer V1 to cover the entire surface of the first viscoelastic layer. The second viscoelastic layer V2 is stacked on the first constraint layer C1 to cover the entire surface of the first constraint layer C1. As the second viscoelastic layer V2, a viscoelastic layer whose damping characteristics are good at low temperature is used. The second constraint layer C2 is stacked on the second viscoelastic layer V2 to cover the entire surface of the second viscoelastic layer V2.

The features of the viscoelastic layer (damper) whose damping characteristics are good at low temperature are that it has a peak of loss factor at the frequency of 7 kHz and at temperatures ranging from −5° C. to 20° C. and it has Shear Modulus of 1 MPa or more. As the material for the viscoelastic layer whose damping characteristics are good at low temperature, for example, there is MD45 (trade name) of JDC, Inc. The MD45 has a peak of loss factor at the frequency of 7 kHz and at the temperature of 9° C. The MD45 also has Shear Modulus of 2 MPa at the frequency and temperature at which the loss factor peaks.

The features of the viscoelastic layer (damper) whose damping characteristics are good at high temperature are that it has a peak of loss factor at the frequency of 7 kHz and at temperatures ranging from 40° C. to 65° C. and it has Shear Modulus of 1 MPa or more. As the material for the viscoelastic layer whose damping characteristics are good at high temperature, for example, there is MD90 (trade name) of JDC, Inc. The MD90 has a peak of loss factor at the frequency of 7 kHz and at the temperature of 53° C. The MD90 also has Shear Modulus of 4 MPa at the frequency and temperature at which the loss factor peaks.

As an example, the feature of two viscoelastic layers whose damping characteristics are different is that a difference in temperature is 20° C. or higher when the loss factor peaks under the same frequency condition. Furthermore, the feature of the two viscoelastic layers is that a difference in temperature is 20° C. or higher under the same frequency condition when Shear Modulus is 1 MPa. In the first embodiment, the first and second viscoelastic layers V1 and V2 exhibit different damping characteristics in different temperature ranges, such as temperature ranges that differ by at least 10° C. or 20° C.

For the first and second constraint layers C1 and C2, a variety of publicly-known materials can be selected and, for example, Mylar A (registered trademark) of TEKRA, polyimide film of DuPont, and Kaptori (registered trademark) of DuPont can be used. The first and second constraint layers C1 and C2 may be formed of a hard material such as stainless steel (material whose Young's modulus is 180 GPa at 23° C.)

Since the damper 70 configured as described above includes first and second viscoelastic layers V1 and V2 that differ in temperature range exhibiting good damping characteristics, it can suppress the torsional vibration mode of the load beam 42 over a wide temperature range. Since, furthermore, the damper 70 is put on the first and second welding portions W1 and W2 of the load beam 42 and the flexure 40, it can effectively attenuate the torsional vibration that is easily transmitted through the first and second welding portions W1 and W2.

An advantage of suppressing the torsional vibration will be described.

FIG. 8 shows an example of torsional vibration of the load beam in the track direction of the magnetic head at the time of vibration of the piezoelectric elements. In the example of FIG. 8, there is a resonance peak P of the primary torsional vibration near the frequency of 7.6 kHz, and the vibration in the track direction is excited by the vibration of the piezoelectric elements.

Figure 9:
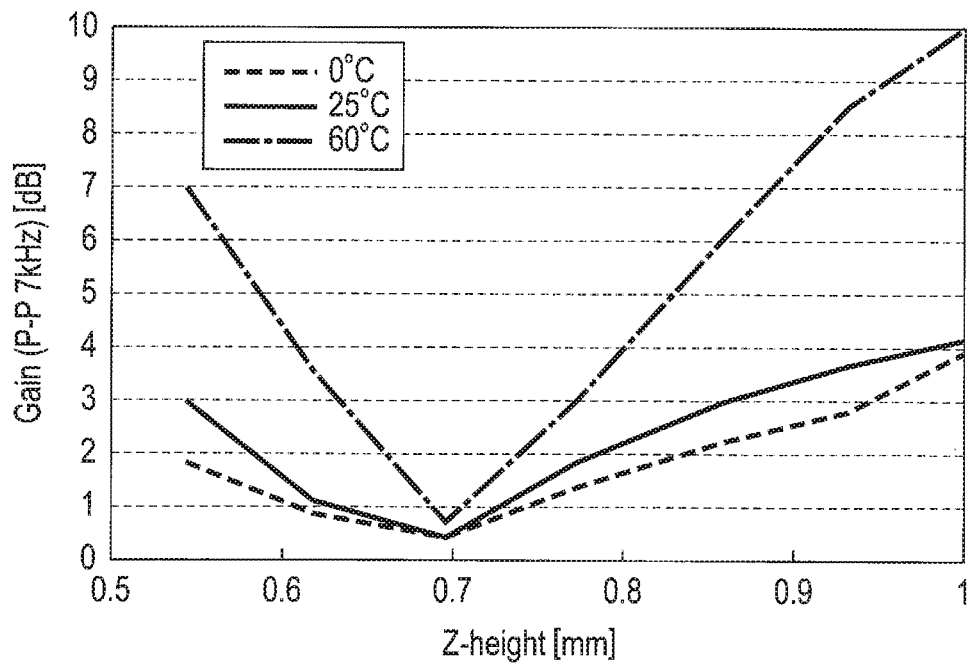
FIG. 9 is a graph of primary torsional vibration damping characteristics of a low-temperature viscoelastic layer with good characteristics.

FIG. 9 shows the primary torsional vibration damping characteristics of the viscoelastic layer (second viscoelastic layer) whose damping characteristics are good at low temperature. In FIG. 9, the horizontal axis represents Z-height (floating height of the head) and the vertical axis represents the gain of the primary torsional vibration (Peak to Peak) (P-P). Usually, the shape and the bending position of the load beam are adjusted such that the primary torsional vibration of the load beam is minimized at the target floating height. The load beam of the first embodiment is so formed that it is optimized at the floating height of, e.g., 0.7 mm.

As shown in FIG. 9, the viscoelastic layer (second viscoelastic layer) whose damping characteristics are good at low temperature exhibits relatively good damping characteristics in a broad Z-height range at the temperature ranging from 0° C. to 25° C. However, at a high temperature of about 60° C., the primary torsional vibration gain increases significantly if the floating height deviates from the target value.

Figure 10:
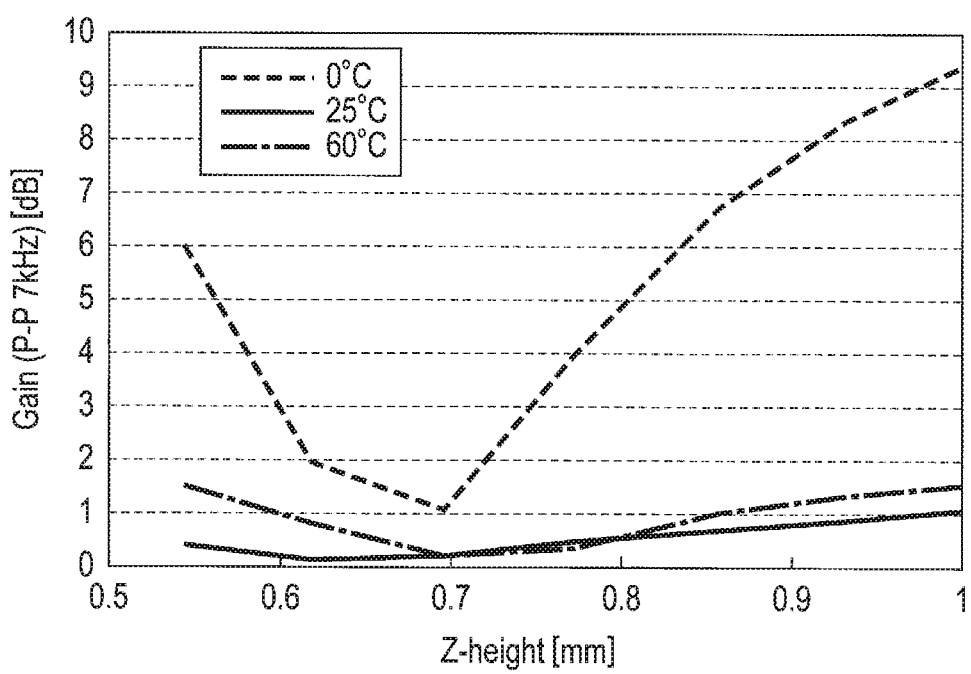
FIG. 10 is a graph of primary torsional vibration damping characteristics of a high-temperature viscoelastic layer with good characteristics.

FIG. 10 shows primary torsional vibration damping characteristics of a viscoelastic layer (first viscoelastic layer) whose damping characteristics are good at high temperature. As shown in FIG. 10, the viscoelastic layer (first viscoelastic layer) exhibits relatively good damping characteristics in a broad Z-height range at temperatures ranging from 25° C. to 60° C. At a low temperature of about 0° C., the primary torsional vibration gain increases significantly if the flying height deviates from the target value.

Figure 11:
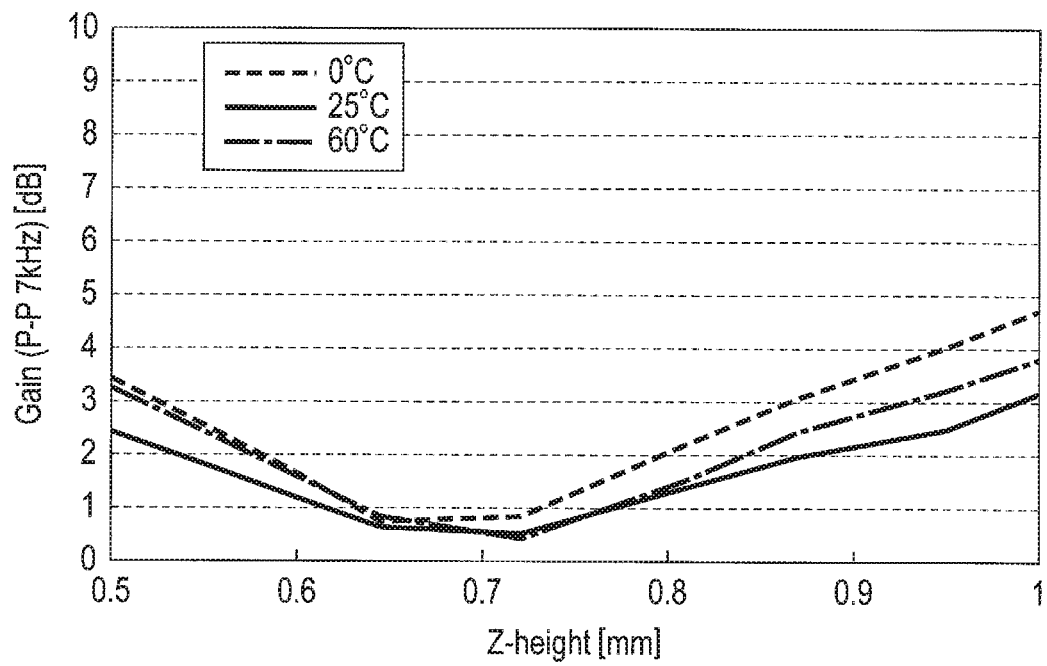
FIG. 11 is a graph of damping characteristics of a damper according to the first embodiment.

FIG. 11 shows damping characteristics of the damper 70 including a first viscoelastic layer and a second viscoelastic layer according to the first embodiment. It is seen from FIG. 11 that the damper 70 has good damping characteristics over a wide temperature of 0° C. to 60° C., that is, the primary torsional vibration gain decreases. In the first embodiment, the first viscoelastic layer V1 of the damper 70 is in contact with the load beam 42, and the damping characteristics of the first viscoelastic layer V1 are greatly improved at high temperature.

Figure 12:
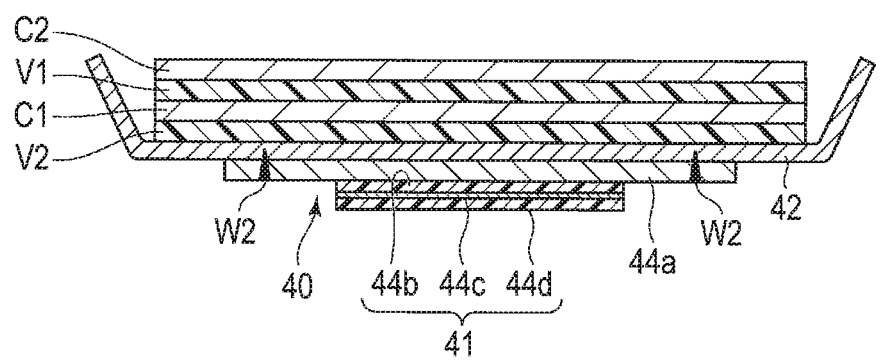
FIG. 12 is a sectional view of the damper and the head suspension assembly according to a modification to the first embodiment.

FIG. 12 is a sectional view showing a damper according to a modification to the first embodiment. In the modification, the second visooelastic layer V2 whose damping characteristics are good at low temperature is stuck on the upper surface of the load beam. 42, and the first constraint layer C1, the first viscoelastic layer V1 and the second constraint layer C2 are stacked in order on the second viscoelastic layer V2.

Figure 13:
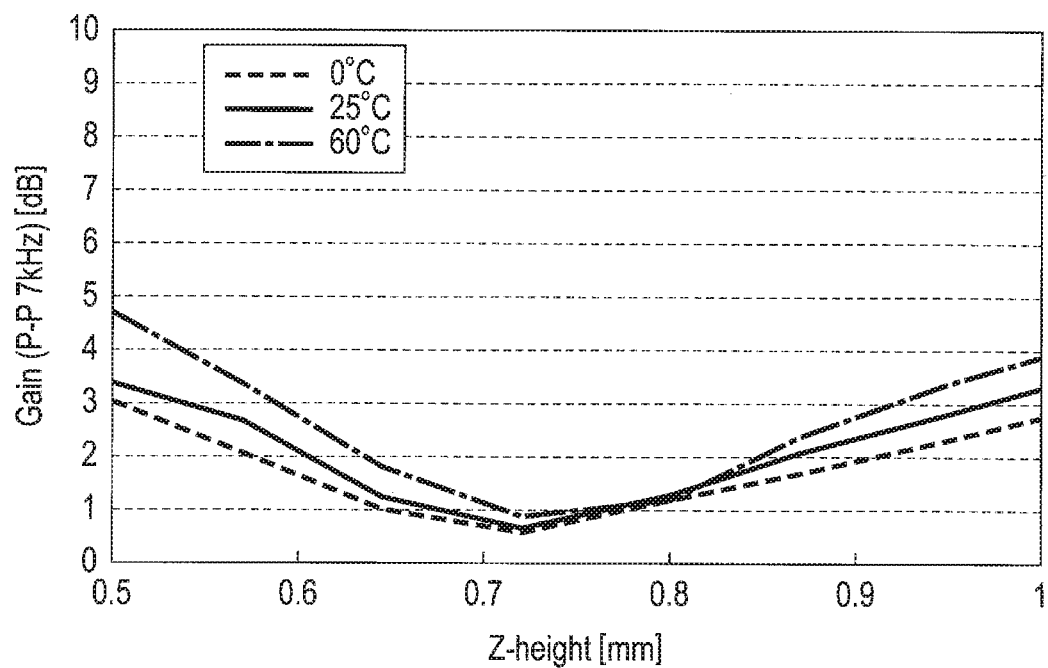
FIG. 13 is a graph of damping characteristics of the damper according to the modification.

FIG. 13 shows damping characteristics of the damper 70 according to the modification. It is seen from FIG. 13 that the damper 70 has good damping characteristics over a wide temperature of 0° C. to 60° C., that is, the primary torsional vibration gain decreases. In the modification, the second viscoelastic layer V2 of the damper 70 is in contact with the load beam 42, and the damping characteristics of the second viscoelastic layer V2 are greatly improved at low temperature.

Figure 14:
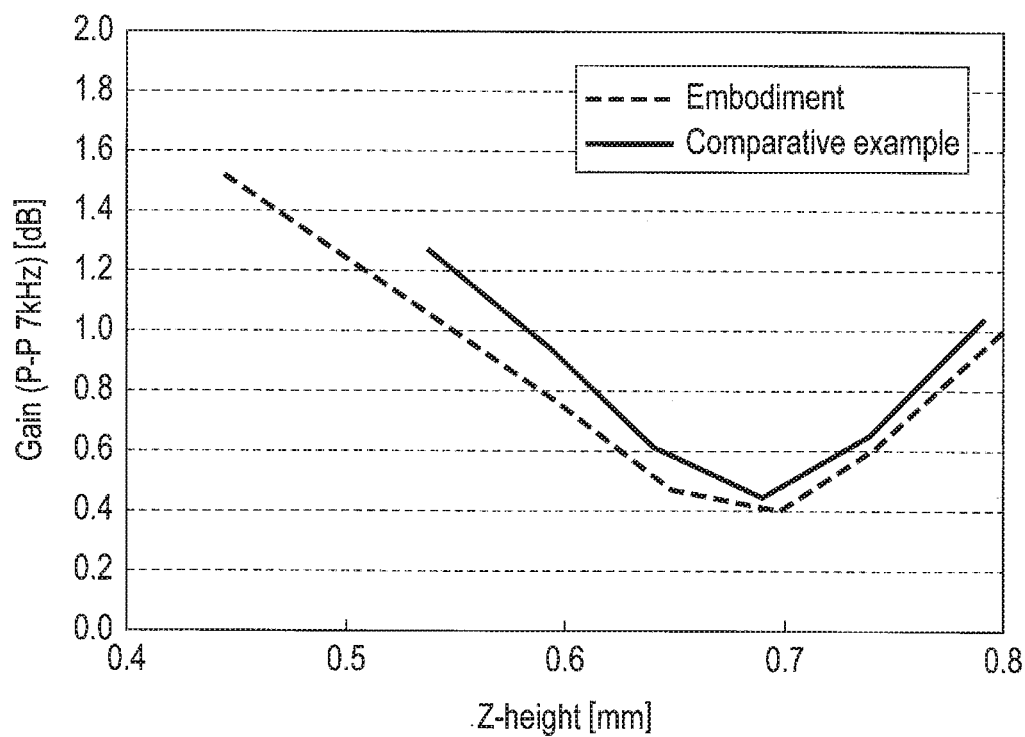
FIG. 14 is a graph of damping characteristics of the damper of the head suspension assembly according to the first embodiment and the damper of a head suspension assembly according to a comparative example.

FIG. 14 shows the comparison between the damping characteristics of the damper 70 according to the first embodiment and those of a damper according to a comparative example. The damper according to the comparative example is laid on only one welding portion of the load beam, e.g., only the second welding portion on the proximal end side, and is not laid on the first welding portion.

As shown in FIG. 14, the damper 70 of the first embodiment, which is provided to cover both the first and second welding portions W1 and W2, is improved in damping characteristics more than those of the damper of the comparative example in a broad Z-height rang.

As described above, according to the head suspension assembly and the HDD according to the first embodiment, the damper 70 can suppress the torsional vibration of the load beam 42 effectively over a wide temperature range.

Thus, the head suspension assembly and the HDD can improve the accuracy of positioning of the head.

Next is a description of head suspension assemblies according to alternative embodiments. In the description of these alternative embodiments to follow, like reference numbers are used to designate the same parts as those of the first embodiment, and a detailed description thereof will be omitted or simplified. Elements different from those of the first embodiment will mainly be described.

Second Embodiment

Figure 15:
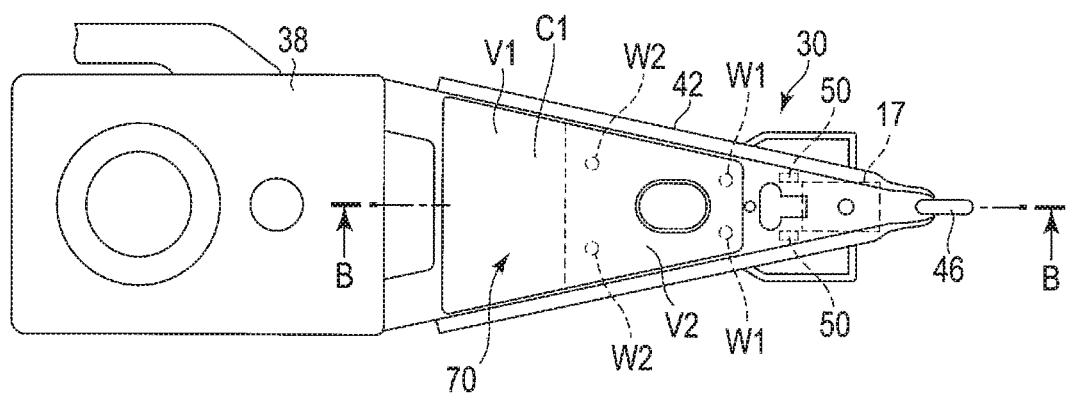
FIG. 15 a plan view of a head suspension assembly of an HDD according to a second embodiment.
Figure 16:
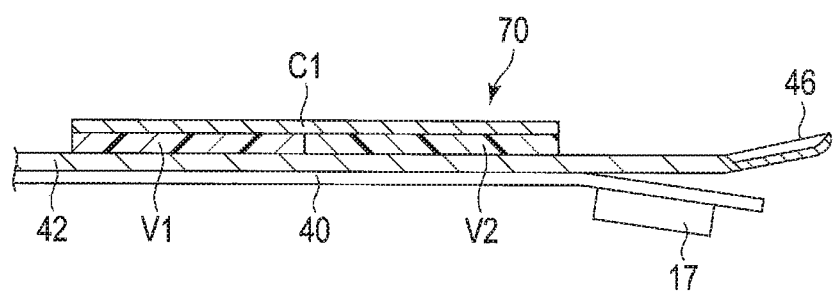
FIG. 16 is a sectional view of the head suspension assembly, taken along line B-B of FIG. 15.

FIG. 15 is a plan view of a head suspension assembly 30 of an HDD according to a second embodiment and FIG. 16 is a sectional view of the head suspension assembly 30, taken along line B-B of FIG. 15.

As illustrated in FIGS. 15 and 16, in the head suspension assembly 30 of the second embodiment, a damper 70 is stuck on the upper surface of a load beam 42 (the surface opposite to the lower surface on which a flexure 40 is mounted) to cover most of the upper surface of the load beam 42 including first and second welding portions W1 and W2.

The damper 70 includes one viscoelastic layer stuck on the upper surface of the load beam 42 and a first constraint layer C1 stacked on the viscoelastic layer. The viscoelastic layer is formed of two types of viscoelastic layers having different damping characteristics. More specifically, the viscoelastic layer includes a first viscoelastic layer V1 whose damping characteristics are good at high temperature and a second viscoelastic layer V2 whose damping characteristics are good at low temperature, and these first and second viscoelastic layers V1 and V2 are arranged side by side on the same plane to form one viscoelastic layer. In the present embodiment, the first viscoelastic layer V1 is placed on the proximal end side of the load beam 42 and the second viscoelastic layer V2 is placed on the distal end side of the load beam 42 to cover the first and second welding portions W1 and W2.

According to the second embodiment described above, two types of viscoelastic layers having different damping characteristics are formed and the first and second welding portions are laid on each other to dispose the damper, which makes it possible to suppress the torsional vibration of the load beam effectively over a wide temperature range. Therefore, the head suspension assembly and the HDD can be improved in the accuracy of positioning of the head.

Note that in the second embodiment, the first and second viscoelastic layers V1 and V2 may be arranged reversely. That is, the second viscoelastic layer V2 may be placed on the proximal end side of the load beam 42 and the first viscoelastic layer V1 may be placed on the distal end side of the load beam 42.

Third Embodiment

Figure 17:
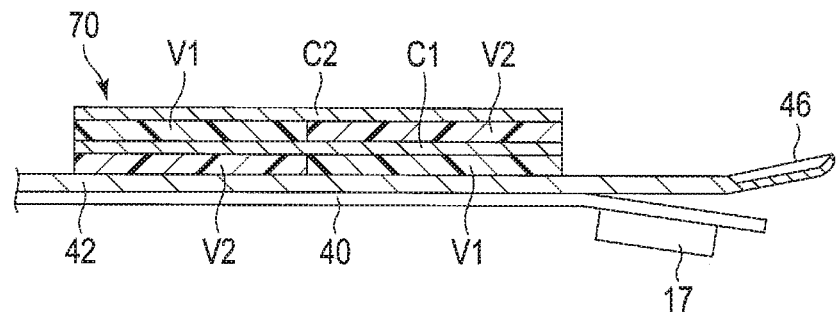
FIG. 17 is a sectional view of a head suspension assembly of an HDD according to a third embodiment.

FIG. 17 is a sectional view of a head suspension assembly 30 of an HDD according to a third embodiment.

As illustrated in FIG. 17, in the head suspension assembly 30, a damper 70 is stuck on the upper surface of a load beam 42 (the surface opposite to the lower surface on which a flexure 40 is mounted) to cover most of the upper surface of the load beam 42 including first and second welding portions W1 and W2.

According to the third embodiment, the damper 70 includes a first-layered viscoelastic layer (first layer) stuck on the upper surface of the load beam 42, a first constraint layer C1 stacked on the viscoelastic layer, a second-layered viscoelastic layer (second layer) stacked on the first constraint layer C1, and a second constraint layer C2 stacked on the second-layered viscoelastic layer (second layer). The first-layered and second-layered viscoelastic layers are each formed of two types of viscoelastic layers having different damping characteristics. More specifically, the first-layered viscoelastic layer includes a first viscoelastic layer V1 whose damping characteristics are good at high temperature and a second viscoelastic layer V2 whose damping characteristics are good at low temperature, and these first and second viscoelastic layers V1 and V2 are arranged side by side on the same plane to form one viscoelastic layer. In the third embodiment, the second viscoelastic layer V2 is placed on the proximal end side of the load beam 42 and the first viscoelastic layer V1 is placed on the distal end side of the load beam 42 to cover the first and second welding portions W1 and W2.

The second-layered viscoelastic layer includes a first viscoelastic layer V1 whose damping characteristics are good at high temperature and a second viscoelastic layer V2 whose damping characteristics are good at low temperature, and these first and second viscoelastic layers V1 and V2 are arranged side by side on the same plane to form one viscoelastic layer. In the third embodiment, the first viscoelastic layer V1 is placed on the proximal end side of the load beam 42 and put on the second viscoelastic layer V2 of the first layer. The second viscoelastic layer V2 is placed on the distal end side of the load beam 42 and put on the first viscoelastic layer V1 of the first layer.

The second viscoelastic layer V2 of the first layer and the first viscoelastic layer V1 of the second layer have substantially the same planar shape and are so arranged that their almost all surfaces are opposed to each other with the first constraint layer C1 therebetween. The first viscoelastic layer V1 of the first layer and the second viscoelastic layer V2 of the second layer have substantially the same planar shape and are so arranged that their almost all surfaces are opposed to each other with the first constraint layer C1 therebetween.

The first and second viscoelastic layers V1 and V2 which are put on each other in their thickness direction, are not limited to the configuration having the same planar shape but may have different planar shapes and different dimensions.

According to the third embodiment described above, two types of viscoelastic layers having different damping characteristics are arranged side by side in the plane direction and further put on each other in the thickness direction of the damper (in the direction intersecting the surface). The damper is also laid on the first and second welding portions of the load beam. Thus, the damper 70 makes it possible to suppress the torsional vibration of the load beam effectively over a wide temperature range. Therefore, the head suspension assembly and the HDD can be improved in the accuracy of positioning of the head.

Fourth Embodiment

Figure 18:
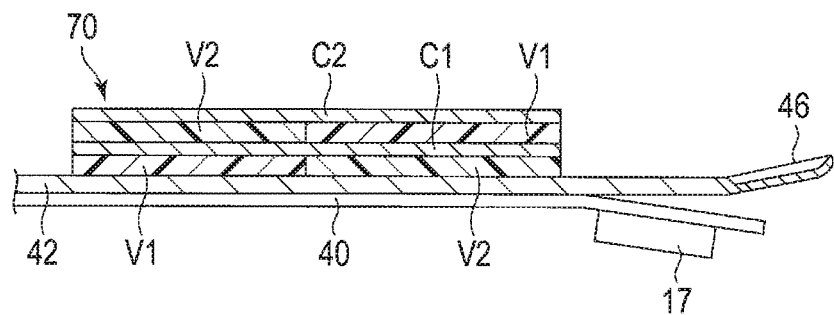
FIG. 18 is a sectional view of a head suspension assembly of an HDD according to a fourth embodiment.

FIG. 18 is a sectional view of a head suspension assembly of an HDD according to a fourth embodiment.

As illustrated in FIG. 18, in the fourth embodiment, in a first-layered viscoelastic layer (first layer) and a second-layered viscoelastic layer (second layer) of a damper 70, the position of arrangement of first and second viscoelastic layers V1 and V2 is opposite to that in the third embodiment described above. Specifically, in the fourth embodiment, the first viscoelastic layer V1 of the first layer is placed on the proximal end side of a load beam 42, and the second viscoelastic layer V2 thereof is placed on the distal end side of the load beam 42 to cover first and second welding portions W1 and W2.

The first viscoelastic layer V1 of the second layer is placed on the distal end side of the load beam 42 and put on the second viscoelastic layer V2 of the first layer. The second viscoelastic layer V2 of the second layer is placed on the proximal end side of the load beam 42 and put on the first viscoelastic layer V1 of the first layer.

The second viscoelastic layer V2 of the first layer and the first viscoelastic layer V1 of the second layer have substantially the same planar shape and are so arranged that their almost all surfaces are opposed to each other with the first constraint layer C1 therebetween. The first viscoelastic layer V1 of the first layer and the second viscoelastic layer V2 of the second layer have substantially the same planar shape and are so arranged that their almost all surfaces are opposed to each other with the first constraint layer C1 therebetween.

The first and second viscoelastic layers V1 and V2 which are put on each other in their thickness direction, are not limited to the configuration having the same planar shape but may have different planar shapes and different dimensions.

The fourth embodiment described above can bring about advantages similar to those of the foregoing third embodiment. The fourth embodiment can thus provide a head suspension assembly and an HDD capable of suppressing the torsional vibration of the load beam and improving in the accuracy of positioning of the head.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the position of the damper is not limited to the upper surface of the load beam, but it may be laid on the lower surface of the load beam (flexure mounting surface). In this case, the damper can also be laid on the flexure. The viscoelastic layers and the constraint layers of the damper are not limited to the configuration having the same planer shape and the same dimension, but may have different planar shapes and different dimensions. The first-layered viscoelastic layer and the second-layered viscoelastic layer may have different planar shapes. In the damper, the number of layers of the viscoelastic layer is not limited to two, but the viscoelastic layer may be formed in three or more layers.

Furthermore, the damper can be so configured that the first viscoelastic layer is stuck on the upper surface of the load beam, the first constraint layer is stacked on the first viscoelastic layer, the second viscoelastic layer is stuck on the lower surface of the load beam, and the second constraint layer is stacked on the second viscoelastic layer. In this case, the upper surface side of the load beam may be a second viscoelastic layer and the lower surface side of the load beam may be a first viscoelastic layer.

The paired piezoelectric elements composing a microactuator is located on the proximal end side of the load beam 35 with respect to the magnetic head 17, but they need not be located thereon. For example, the piezoelectric elements may be arranged on both sides of a support portion (tongue portion), which supports the magnetic head, in the width direction thereof, and may be arranged alongside the magnetic head. Furthermore, the number of piezoelectric elements is not limited to two, but for example, a single piezoelectric element can be used.

What is claimed is:

1. A head suspension assembly comprising:
   a support plate having a first side, a second side, a proximal end and a distal end;
   a wiring member placed on the first side of the support plate and including a metal plate and a wiring board laid on the metal plate, the metal plate including a first joined portion joined to the support plate close to the distal end and a second joined portion joined to the support plate and located on a proximal end side of the support plate with respect to the first joined portion;
   a head mounted on the wiring member;
   an extendable piezoelectric element mounted on the wiring member; and
   a damper including a viscoelastic layer and a constraint layer stacked on the viscoelastic layer and attached to the second side of the support plate to overlap the first joined portion and the second joined portion.

2. The head suspension assembly of claim 1, wherein the viscoelastic layer of the damper includes two or more types of viscoelastic layers having different damping characteristics.

3. The head suspension assembly of claim 1, wherein:
   the viscoelastic layer of the damper includes a first viscoelastic layer whose damping characteristics are good at high temperature and a second viscoelastic layer whose damping characteristics are good at low temperature; and
   the first viscoelastic layer is stuck on the second side of the support plate to overlap the first joined portion and the second joined portion, the constraint layer is stacked on the first viscoelastic layer, and the second viscoelastic layer is stacked on the constraint layer.

4. The head suspension assembly of claim 1, wherein:
   the viscoelastic layer of the damper includes a first viscoelastic layer whose damping characteristics are good at high temperature and a second viscoelastic layer whose damping characteristics are good at low temperature; and
   the second viscoelastic layer is stuck on the second side of the support plate to overlap the first joined portion and the second joined portion, the constraint layer is stacked on the second viscoelastic layer, and the first viscoelastic layer is stacked on the constraint layer.

5. The head suspension assembly of claim 1, wherein:
   the viscoelastic layer of the damper includes a first viscoelastic layer whose damping characteristics are good at high temperature and a second viscoelastic layer whose damping characteristics are good at low temperature; and
   the first viscoelastic layer is stuck on the support plate and placed on the proximal end side of the support plate, the second viscoelastic layer is stuck on the support plate and placed on a distal end side of the support plate with respect to the first viscoelastic layer, the first viscoelastic layer and the second viscoelastic layer overlap the first joined portion and the second joined portion, and the constraint layer is stacked on the first viscoelastic layer and the second viscoelastic layer.

6. The head suspension assembly of claim 1, wherein:
   the viscoelastic layer of the damper includes a first viscoelastic layer whose damping characteristics are good at high temperature and a second viscoelastic layer whose damping characteristics are good at low temperature; and the second viscoelastic layer is stuck on the support plate and placed on the proximal end side of the support plate, the first viscoelastic layer is stuck on the support plate and placed on a distal end side of the support plate with respect to the second viscoelastic layer, the first viscoelastic layer and the second viscoelastic layer overlap the first joined portion and the second joined portion, and the constraint layer is stacked on the first viscoelastic layer and the second viscoelastic layer.

7. The head suspension assembly of claim 1, wherein:
the viscoelastic layer of the damper includes a first layer stuck on the support plate and a second layer stacked on the first layer with the constraint layer therebetween;
the first layer and the second layer each include a first viscoelastic layer whose damping characteristics are good at high temperature and a second viscoelastic layer whose damping characteristics are good at low temperature;
the second viscoelastic layer of the first layer is stuck on the support plate and placed on the proximal end side of the support plate, the first viscoelastic layer of the first layer is stuck on the support plate and placed on a distal end side of the support plate with respect to the second viscoelastic layer, the first viscoelastic layer and the second viscoelastic layer overlap the first joined portion and the second joined portion, and the constraint layer is stacked on the first viscoelastic layer and the second viscoelastic layer; and
the first viscoelastic layer of the second layer is stacked on the constraint layer and placed on the proximal end side of the support plate, and the second viscoelastic layer of the second layer is stacked on the constraint layer and placed on the distal end side of the support plate with respect to the first viscoelastic layer.

8. The head suspension assembly of claim 1, wherein:
the viscoelastic layer of the damper includes a first layer stuck on the support plate and a second layer stacked on the first layer with the constraint layer therebetween;
the first layer and the second layer each include a first viscoelastic layer whose damping characteristics are good at high temperature and a second viscoelastic layer whose damping characteristics are good at low temperature;
the first viscoelastic layer of the first layer is stuck on the support plate and placed on the proximal end side of the support plate, the second viscoelastic layer of the first layer is stuck on the support plate and placed on a distal end side of the support plate with respect to the first viscoelastic layer, the first viscoelastic layer and the second viscoelastic layer overlap the first joined portion and the second joined portion, and the constraint layer is stacked on the first viscoelastic layer and the second viscoelastic layer; and
the second viscoelastic layer of the second layer is stacked on the constraint layer and placed on the proximal end side of the support plate, and the first viscoelastic layer of the second layer is stacked on the constraint layer and placed on the distal end side of the support plate with respect to the second viscoelastic layer.

9. A disk device comprising:
a disk-shaped recording medium including a recording layer; and
the head suspension assembly of claim 1, which supports a magnetic head.

10. The disk device of claim 9, wherein the viscoelastic layer of the damper includes two or more types of viscoelastic layers having different damping characteristics.

11. The disk device of claim 9, wherein:
the viscoelastic layer of the damper includes a first viscoelastic layer whose damping characteristics are good at high temperature and a second viscoelastic layer whose damping characteristics are good at low temperature; and
the first viscoelastic layer is stuck on the support plate to overlap the first joined portion and the second joined portion, the constraint layer is stacked on the first viscoelastic layer, and the second viscoelastic layer is stacked on the constraint layer.

12. The disk device of claim 9, wherein:
the viscoelastic layer of the damper includes a first viscoelastic layer whose damping characteristics are good at high temperature and a second viscoelastic layer whose damping characteristics are good at low temperature; and
the second viscoelastic layer is stuck on the support plate to overlap the first joined portion and the second joined portion, the constraint layer is stacked on the second viscoelastic layer, and the first viscoelastic layer is stacked on the constraint layer.

13. The disk device of claim 9, wherein:
the viscoelastic layer of the damper includes a first viscoelastic layer whose damping characteristics are good at high temperature and a second viscoelastic layer whose damping characteristics are good at low temperature; and
the first viscoelastic layer is stuck on the support plate and placed on the proximal end side of the support plate, the second viscoelastic layer is stuck on the support plate and placed on a distal end side of the support plate with respect to the first viscoelastic layer, the first viscoelastic layer and the second viscoelastic layer overlap the first joined portion and the second joined portion, and the constraint layer is stacked on the first viscoelastic layer and the second viscoelastic layer.

14. The disk device of claim 9, wherein:
the viscoelastic layer of the damper includes a first viscoelastic layer whose damping characteristics are good at high temperature and a second viscoelastic layer whose damping characteristics are good at low temperature; and
the second viscoelastic layer is stuck on the support plate and placed on the proximal end side of the support plate, the first viscoelastic layer is stuck on the support plate and placed on a distal end side of the support plate with respect to the second viscoelastic layer, the first viscoelastic layer and the second viscoelastic layer overlap the first joined portion and the second joined portion, and the constraint layer is stacked on the first viscoelastic layer and the second viscoelastic layer.

15. The disk device of claim 9, wherein:
the viscoelastic layer of the damper includes a first layer stuck on the support plate and a second layer stacked on the first layer with the constraint layer therebetween;
the first layer and the second layer each have a first viscoelastic layer whose damping characteristics are good at high temperature and a second viscoelastic layer whose damping characteristics are good at low temperature;
the second viscoelastic layer of the first layer is stuck on the support plate and placed on the proximal end side of the support plate, the first viscoelastic layer of the first layer is stuck on the support plate and placed on a distal end side of the support plate with respect to the second viscoelastic layer, the first viscoelastic layer and the second viscoelastic layer overlap the first joined portion and the second joined portion, and the constraint layer is stacked on the first viscoelastic layer and the second viscoelastic layer; and the first viscoelastic layer of the second layer is stacked on the constraint layer and placed on the proximal end side of the support plate, and the second viscoelastic layer of the second layer is stacked on the constraint layer and placed on the distal end side of the support plate with respect to the first viscoelastic layer.

16. The disk device of claim 9, wherein:

the viscoelastic layer of the damper includes a first layer stuck on the support plate and a second layer stacked on the first layer with the constraint layer therebetween;

the first layer and the second layer each have a first viscoelastic layer whose damping characteristics are good at high temperature and a second viscoelastic layer whose damping characteristics are good at low temperature;

the first viscoelastic layer of the first layer is stuck on the support plate and placed on the proximal end side of the support plate, the second viscoelastic layer of the first layer is stuck on the support plate and placed on a distal end side of the support plate with respect to the first viscoelastic layer, the first viscoelastic layer and the second viscoelastic layer overlap the first joined portion and the second joined portion, and the constraint layer is stacked on the first viscoelastic layer and the second viscoelastic layer; and the second viscoelastic layer of the second layer is stacked on the constraint layer and placed on the proximal end side of the support plate, and the first viscoelastic layer of the second layer is stacked on the constraint layer and placed on the distal end side of the support plate with respect to the second viscoelastic layer.

\* \* \* \* \*